(12) United States Patent
Hubbard

(10) Patent No.: US 6,508,055 B2
(45) Date of Patent: Jan. 21, 2003

(54) VARIABLE MODE JET ENGINE—SUITABLE FOR STOVL

(76) Inventor: Adrian Alexander Hubbard, 39, Egerton Road, Bushbury Wolverhampton West Mids (GB), WV10 8AU ( * ) Notice: Subject to any disclaimer, the term of this patent is extended or adjusted under 35 U.S.C. 154(b) by 0 days.

(21) Appl. No.: 09/765,700

(22) Filed: Jan. 22, 2001

(65) Prior Publication Data

US 2002/0020167 A1 Feb. 21, 2002

(30) Foreign Application Priority Data

Jul. 4, 2000 (GB) .............................................. 0016310

(51) Int. Cl.[7] ................................................ F02K 3/06
(52) U.S. Cl. ........................... 60/226.1; 60/232; 60/263
(58) Field of Search ............................... 60/226.1, 229, 60/232, 262, 263, 728

(56) References Cited

U.S. PATENT DOCUMENTS

| | | | | |
|---|---|---|---|---|
| 2,912,188 A | * | 11/1959 | Singelmann et al. | 60/232 |
| 3,056,258 A | * | 10/1962 | Marchant et al. | 60/232 |
| 3,160,368 A | * | 12/1964 | Young et al. | 60/232 |
| 3,182,898 A | * | 5/1965 | Hewson | 60/226.1 |
| 3,867,813 A | * | 2/1975 | Leibach | 60/263 |
| 4,050,242 A | * | 9/1977 | Dusa | 60/226.1 |
| 4,222,233 A | * | 9/1980 | Johnson et al. | 60/229 |
| 4,222,234 A | * | 9/1980 | Adamson | 60/226.1 |
| 4,248,041 A | * | 2/1981 | Wilde et al. | 60/229 |
| 5,553,448 A | * | 9/1996 | Farrell et al. | 60/728 |

* cited by examiner

*Primary Examiner*—Michael Koczo

(57) ABSTRACT

This jet engine comprises a complete low bypass turbofan unit 1 including secondary fan unit 2 and engine core, ahead of which sits a larger diameter main fan unit 3 driven from the front of the secondary fan via a long drive shaft 4. A center portion of the main fan feeds the secondary fan via long central duct 5. The outer portion of the main fan is ducted into a split exhaust plenum chamber 6. This chamber has thrust vectoring exhaust mechanisms 7 immediately attached to each side, and then each side then feeds a thrust splitter 10, and then feeds to variable area outer ducting 8, using double-hinged inner and outer doors 9. Both outer ducts rejoin the central duct downstream in a second plenum chamber 11 just ahead of the secondary fan. Between this chamber and secondary fan is an intercooler 12.

7 Claims, 5 Drawing Sheets

VARIABLE MODE JET ENGINE— SUITABLE FOR STOVL

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

This invention relates to a variable mode, turbofan, turbojet, ramjet type jet engine, which is also suitable for short takeoff vertical landing, STOVL. Jet engines are normally built in fixed mode either as turbofans, turbojets or ramjets, this invention sets out to combine all types of engine, plus inclusion of STOVL capability.

BRIEF SUMMARY OF THE INVENTION

According to the present invention there is provided a jet engine comprising of a complete low bypass turbofan unit to the rear, including a secondary fan unit and engine core comprising of compressor, combustion chamber, turbines and secondary bypass duct. Some eight to thirteen feet ahead of which sits a larger diameter main fan unit, driven from the front of the turbofan via a long drive shaft. A center portion of the main fan feeds the secondary fan via a long central duct of roughly the same area as the secondary fan. The outer portion of the airflow from the main fan is ducted into a split exhaust plenum chamber immediately to the rear of the main fan. This chamber has forward mounted thrust-vectoring exhaust nozzles immediately attached to either side, and then each side feeds into variable area outer ducts, using hinged inner and outer doors on either side of the engine. These doors are arranged to split the thrust from the main fan, to exhaust either outwards for bypass or inwards forming a ram into the secondary fan. Both outer ducts then rejoin the long central duct downstream forming a second plenum chamber just ahead of the secondary fan. Between this second chamber and the secondary fan is fitted an in line intercooling device to cool down the incoming air charge.

DETAILED DESCRIPTION OF THE INVENTION

Figure 1:
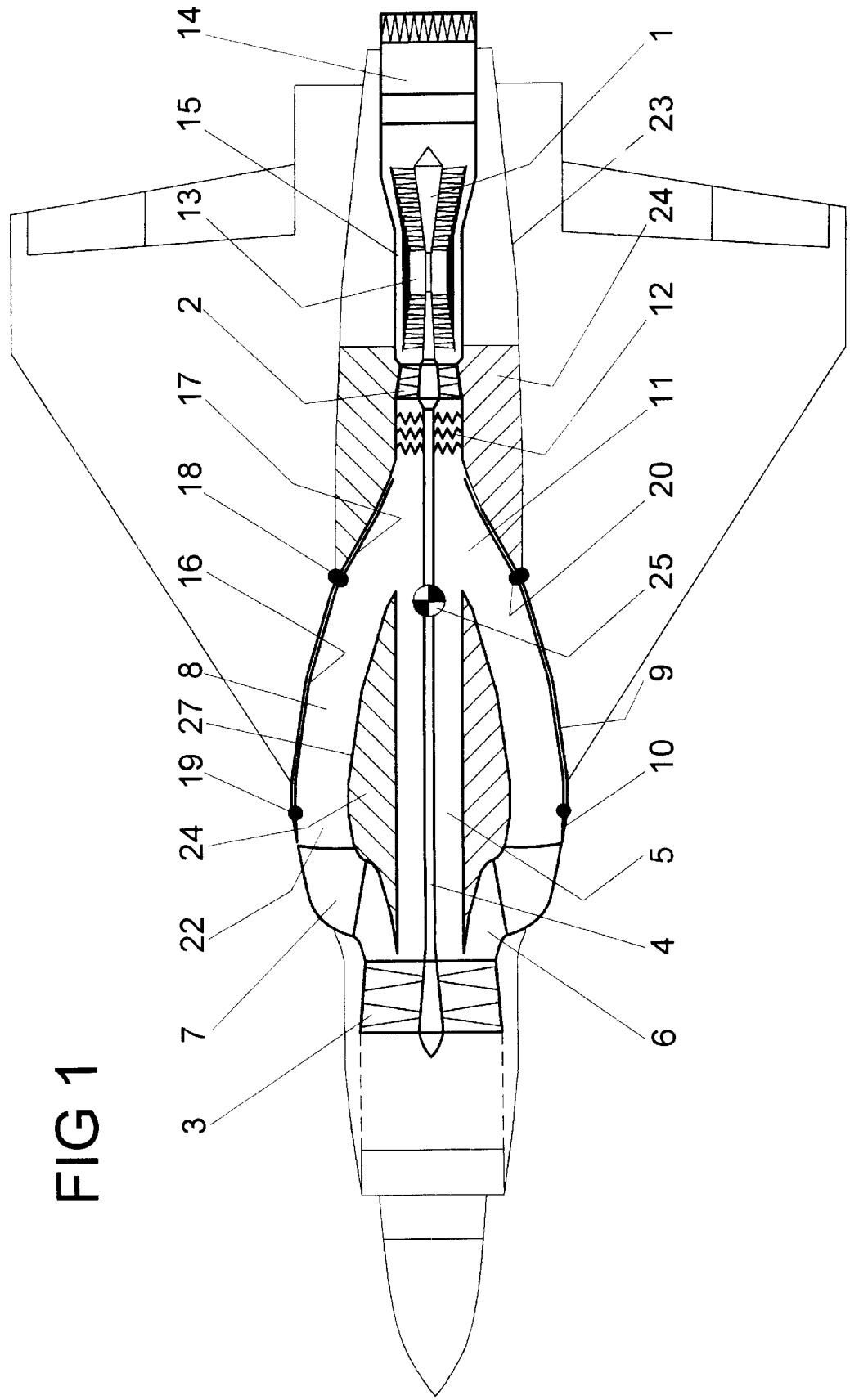
FIG. 1 illustrates the low bypass turbofan/ramjet mode, ramfan; the outer ducting doors are fully open, ramming the airflow from the main fan into the secondary fan, supercharging the secondary fan and engine core at subsonic speeds, and forming a ramjet at supersonic speeds, albeit with rotating inner parts. There is no afterburner on this type of engine.
Figure 2:
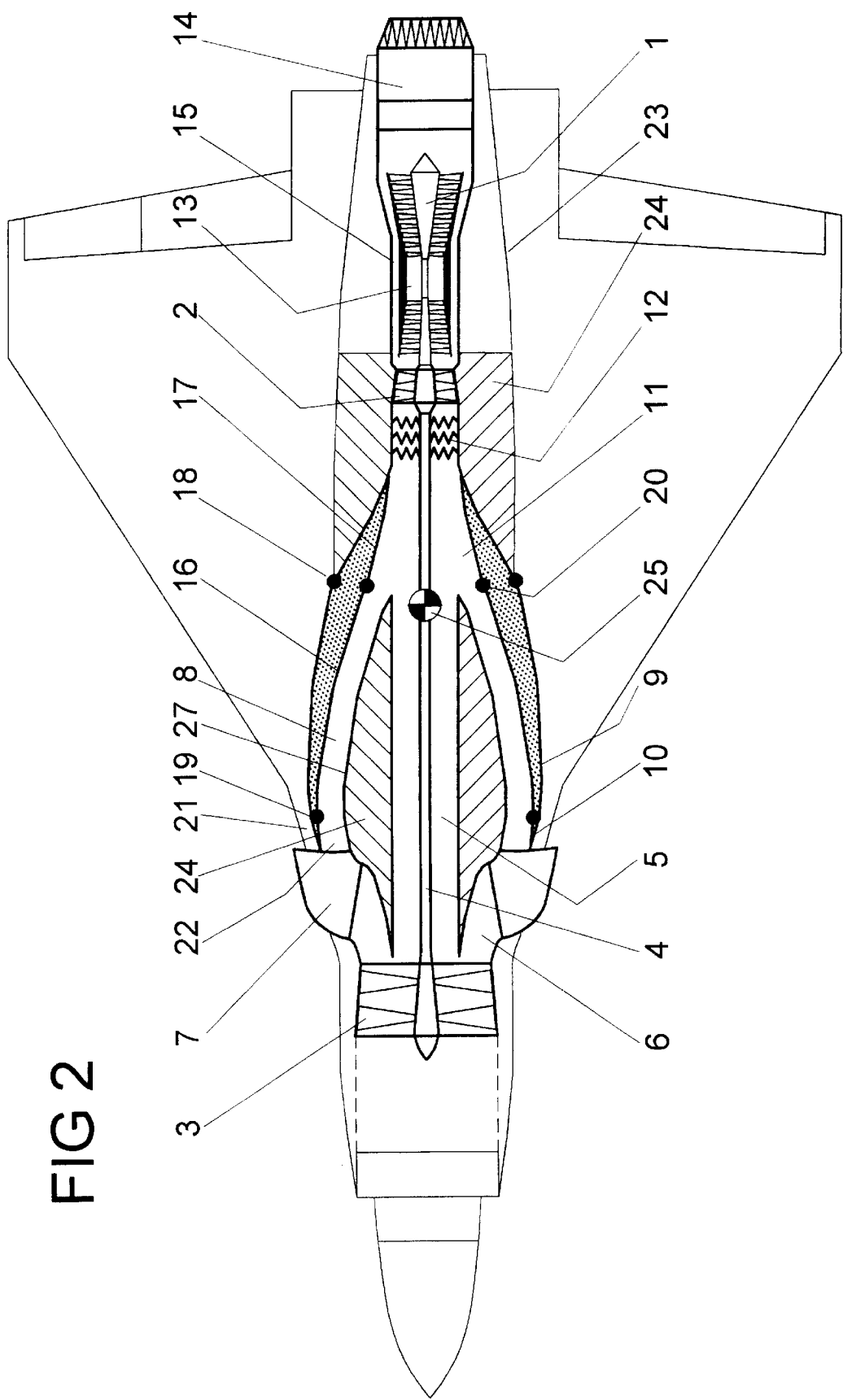
FIG. 2 illustrates the transition between modes and intermediate bypass mode; at subsonic speeds the outer ducting doors are set to the mid position, splitting the outer portion of the main fan thrust and thereby only partially supercharging and partially bypassing the secondary fan and engine core.
Figure 3:
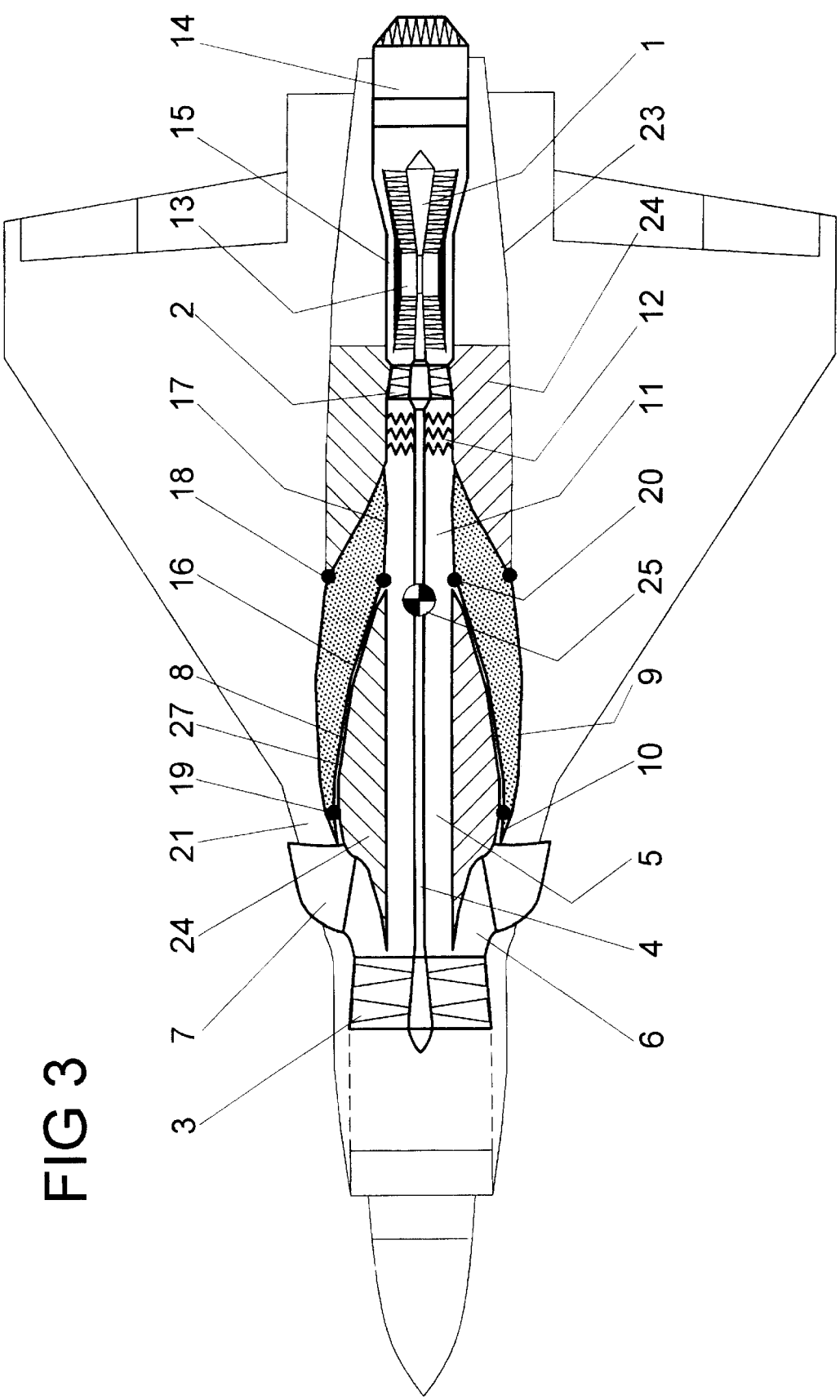
FIG. 3 illustrates the high bypass turbofan mode; at subsonic speeds the outer ducting doors are fully closed, allowing the outer portion of the main fan to completely bypass the secondary fan and engine core.
Figure 3A:
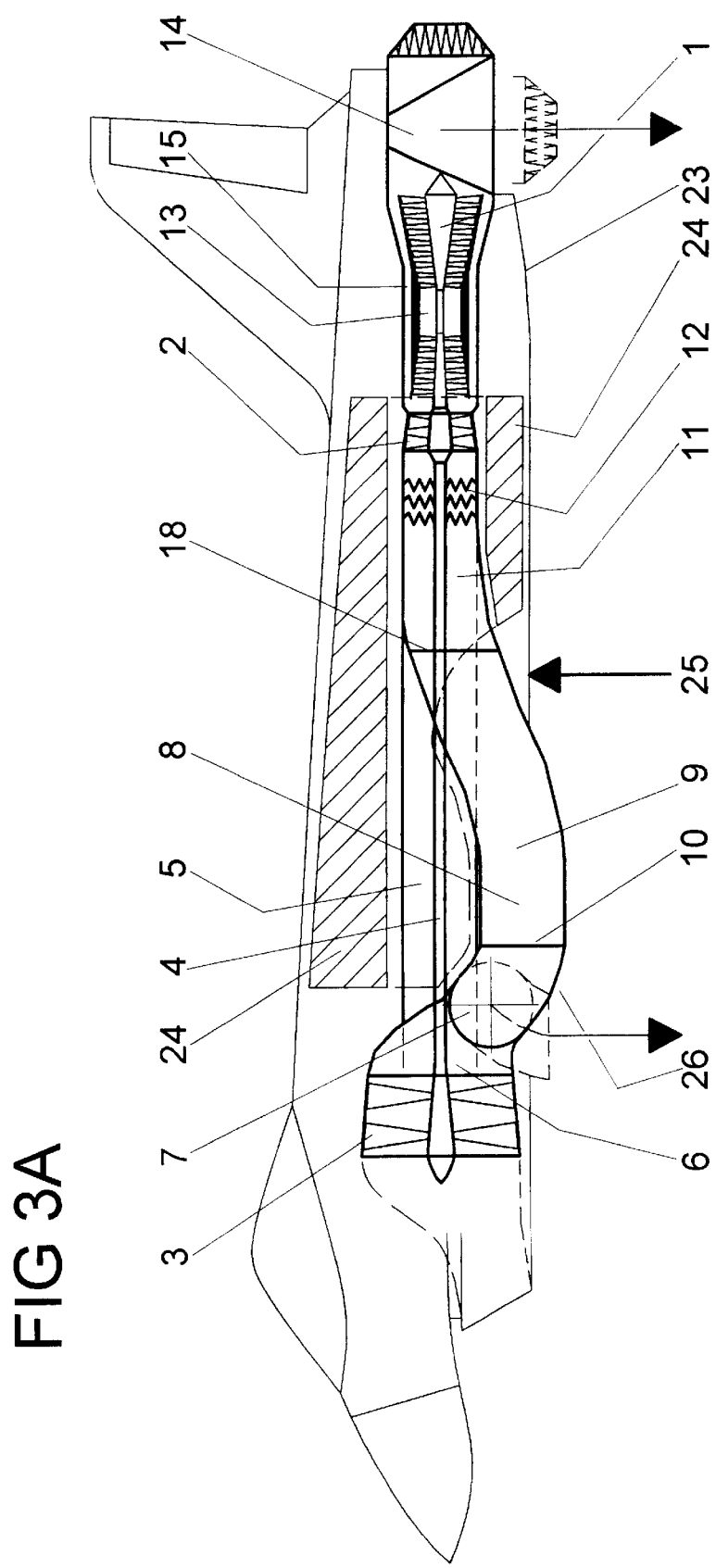
FIG. 3A illustrates the high bypass turbofan/STOVL mode; at low speeds with the outer ducting doors fully closed, the forward mounted thrust vectoring exhaust nozzles are deflected downwards along with the rear variable area nozzle.
Figure 4:
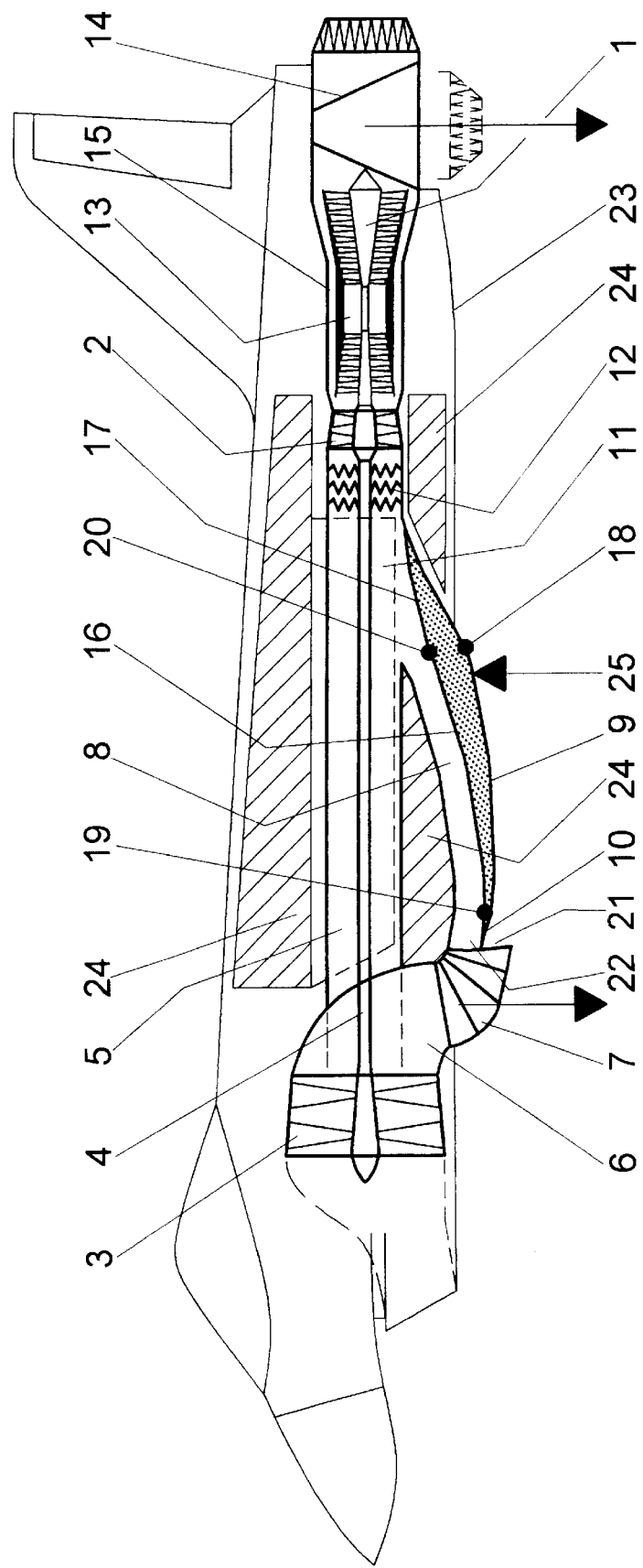
FIG. 4 illustrates the alternative arrangement for the variable area outer ducting wherein there is only one outer duct instead of two. This duct is fitted to the underside of the aircraft fuselage.

Referring to the drawings there is provided a jet engine comprising of a complete low bypass turbofan unit 1 to the rear of the airframe 23 behind the aircraft center of gravity 25, including secondary fan unit 2 and engine core comprising of compressor, combustion chamber, turbines and secondary bypass duct 15. The duct 15 is of fixed ratio and is tuned by the engine designer for maximum mach number required, the duct 15 can be omitted from the engine construction, thereby making the core a pure turbojet, and providing higher supersonic performance.

Some eight to thirteen feet ahead of the core is a larger diameter main fan unit 3, the fan 3 is of 2.5 to 3.5 times greater frontal area than fan 2, and is driven from the front of the turbofan 1 via a long drive shaft 4. A center portion of the fan 3 feeds fan 2 via a long central duct 5 which is of roughly the same area as fan 2. The fan 3 is fitted in the forward part of the airframe 23, ahead of the center of gravity 25.

The outer portion of the airflow from fan 3 is ducted into a split exhaust plenum chamber 6 fitted immediately to the rear. The chamber 6 has forward mounted thrust-vectoring exhaust nozzles 7 immediately attached to either side, each side then feeds into two variable area outer ducts 8; one fitted each side of the engine. The ducts 8 are each defined by an inner wall 27 and hinged inner and outer doors 9, 16 and 17. The doors are fitted to hinges 18, 19 and 20. The outer doors 9 are first hinged at the rear 18, the forward part of inner doors 16 are fitted to the forward part of doors 9 using a second shared hinge 19, a third hinge 20 is fitted to inner doors 16, about three-quarters towards the rear, hence dividing the inner doors into two unequal parts 16 and 17. The inner doors 16 are always parallel to walls 27 with doors 9 in any position, hence outer ducts 8 have variable area constant along whole length of walls 27.

The doors 9 are arranged to split the thrust from nozzles 7, using thrust splitters 10 fitted to hinges 19, to exhaust either outwards for main bypass 21, or inwards forming a ram 22 into fan 2. The splitters 10 are arranged to move transversely across the face of nozzles 7, moving in unison with doors 9, hence varying the degree of supercharging and bypass of fan 2 and core.

The outer ducts 8 rejoin central duct 5 downstream, forming a second plenum chamber 11, just ahead of fan 2. The outer ducts 8 are displaced around the aircraft center of gravity 25, and are positioned lower than fan 3, hence creating a cushion for VTO 26 under airfiame 23. The chamber 6, central duct 5, nozzles 7, outer ducts 8 and chamber 11 are all integral parts of airframe 23, and are surrounded by fuel tanks 24. A single variable area outer duct can be provided alternatively, instead of the two outer ducts. This single outer duct is fitted to the underside of the airframe 23 directly beneath central duct 5, and is an integral airframe component.

The splitter 10 provides a smooth and aerodynamic airflow at all times. The ram 22 provides fan 2 with a subsonic airflow at all times. The fan 3 freewheels at supersonic speeds, allowing the airflow to pass straight through into ram 22.

The doors 9, 16 and 17 totally shut off the main bypass 21 when fully open, providing fully supercharged low bypass turbofan mode at subsonic speeds, and providing ramjet mode at supersonic speeds. The doors 9, 16 and 17 totally shut off the supercharging when fully closed, providing high bypass turbofan engine mode at subsonic speeds.

Between chamber 11 and fan 2 is fitted an in line intercooling device 12, situated in or around the rear of central duct 5, to cool down the incoming air charge.

The engine core has a two-stage combustion chamber 13 to ignite the extra oxygen provided by fan 3 supercharging effect in low bypass turbofan mode.

A rear exhaust nozzle 14 is fitted at the back of duct 15, and is both variable in area and thrust vectoring. The nozzle 14 is arranged to vector the thrust rearwards or downwards and is of a smaller diameter than duct 15 when fully closed. The nozzles 7 and 14 are only deflected downwards with doors 9 fully closed.

The ideal main bypass ratio for this type of engine is around 1.6:1. The ideal secondary bypass ratio for this type of engine is zero, but does not allow for cooling of the engine core and rear exhaust. This engine has no afterburner or thrust augmentation of any kind; fan 3 in this design has replaced the afterburner normally provided on a conventional low bypass turbofan.

Below are some typical figures for this type of engine:

| | |
|---|---|
| Main fan diameter | 46 inches |
| Secondary fan diameter | 28 inches |
| Main bypass ratio | 1.35:1 |
| Secondary bypass ratio | 0.20:1 |
| Static power from main fan (High bypass turbofan mode) | 13500 pounds |
| Static power from rear turbofan (High bypass turbofan mode) | 13500 pounds |
| Thrust split - front/rear | 50%/50% |
| Static combined power (High bypass turbofan mode) | 27000 pounds |
| Static combined power (Supercharged low bypass turbofan mode) | 40500 pounds |

What is claimed is:

1. A variable bypass jet engine fitted with thrust vectoring exhaust nozzles, wherein supersonic performance is achieved entirely with the use of supercharging and ram effect, no afterburner or thrust augmentation of any kind is employed comprising:
   a complete low bypass turbofan including a secondary fan unit and an engine core comprising a compressor, combustion chamber, turbines and secondary bypass duct;
   said turbofan is mounted in the rear of the airframe behind the aircraft center of gravity;
   a larger diameter main fan unit drivingly connected to said turbofan via a long drive shaft or shafts;
   said main fan is 2.5 to 3.5 times greater in frontal area than said secondary fan;
   said main fan is mounted in the forward part of the airframe ahead of the aircraft center of gravity;
   a long central duct of the same area as said secondary fan;
   said central duct feeds said secondary fan from the center portion of said main fan;
   said central duct is located in the center of the airframe and located around the aircraft center of gravity;
   an annular plenum chamber mounted directly to the rear of said main fan, featuring a split exhaust system ejecting from either side of said main fan;
   said chamber excludes the portion of airflowm directed into said central duct;
   said chamber provides main bypass;
   two forward mounted thrust vectoring exhaust nozzles, one immediately attached to each side of said chamber, arranged to exhaust either rearwards or downwards;
   two variable area outer ducts, each defined on the inside by a fixed wall, and on the outside by hinged inner and outer doors;
   said outer ducts are fitted one each side of said central duct and rejoin said central duct downstream behind the aircraft center of gravity;
   a second plenum chamber, formed at the junction between said central duct and said outer ducts, just ahead of said secondary fan;
   said outer ducts are fitted directly behind said nozzles;
   said nozzles feed said outer ducts;
   each said outer doors are first hinged at the rear, the forward part of each said inner doors are fitted to the forward part of each said outer doors using a second shared hinge, a third hinge is fitted to each said inner doors, about three-quarters towards the rear, hence dividing said inner doors each into two unequal parts;
   said inner doors are always parallel to said walls with said outer doors in any position, hence said outer ducts have variable area constant along whole length of said walls;
   said inner and outer door pairings are each fitted with one thrust splitting device mounted on said shared hinge, directly behind said nozzles;
   said devices are arranged to move transversely across the face of said nozzles, moving in unison with said outer doors, hence varying the degree of supercharging and bypass of the said secondary fan and core;
   said devices, in conjunction with said doors, provide a smooth and aerodynamic airflow with said doors in any position;
   said inner doors form a ram into said second chamber when said doors are opened;
   said doors totally shut off said main bypass when fully open, providing fully supercharged low bypass turbofan mode at subsonic speeds, and providing ramjet mode at supersonic speeds;
   said main fan freewheels at supersonic speeds, allowing the airflow to pass straight through into said ram;
   said ram provides said secondary fan with a subsonic airflow at all speeds;
   said doors totally shut off the supercharging when filly closed, providing high bypass turbofan engine mode;
   a two-stage combustion chamber, to provide extra fuel in said supercharged mode, fitted within said engine core;
   a rear mounted thrust vectoring variable area nozzle, with the fixed end fitted to the rear of said secondary bypass duct and arranged to vector the thrust rearwards or downwards;
   said rear nozzle is of a smaller diameter than said secondary bypass duct when fully closed;
   said nozzles are only deflected downwards with said doors fully closed.

2. A variable bypass jet engine fitted with thrust vectoring exhaust nozzles, wherein supersonic performance is achieved entirely with the use of supercharging and ram effect, no afterburner or thrust augmentation of any kind is employed, comprising:

a complete low bypass turbofan including a secondary fan unit and an comprising a compressor, combustion chamber, turbines and secondary bypass duct;

said turbofan is mounted in the rear of the airframe behind the aircraft center of gravity;

a larger diameter main fan unit drivingly connected to said turbofan via a long drive shaft or shafts;

said main fan is 2.5 to 3.5 times greater in frontal area than said secondary fan;

said main fan is mounted in the forward part of the airframe ahead of the aircraft center of gravity;

a long central duct of the same area as said secondary fan;

said central duct feeds said secondary fan from the center portion of said main fan;

said central duct is located in the center of the airframe and located around the aircraft center of gravity;

an annular plenum chamber mounted directly to the rear of said main fan, featuring a single exhaust system ejecting from the underside side of said main fan;

said chamber excludes the portion of airflow directed into said central duct;

said chamber provides main bypass;

one forward mounted thrust vectoring exhaust nozzle, immediately attached to the underside of said chamber, arranged to exhaust either rearwards or downwards;

one variable area outer duct, defined on the inside by a fixed wall, and on the outside by hinged inner and outer doors;

said outer duct is fitted on the underside of said central duct and rejoins said central duct downstream behind the aircraft center of gravity;

a second plenum chamber, formed at the junction between said central duct and said outer duct, just ahead of said secondary fan;

said outer duct is fitted directly behind said nozzle;

said nozzle feeds said outer duct;

said outer door is first hinged at the rear, the forward part of said inner door is fitted to the forward part of said outer door using a second shared hinge, a third hinge is fitted to said inner door, about three-quarters towards the rear, hence dividing the said inner door into two unequal parts;

said inner door is always parallel to said wall with said outer door in any position, hence said outer duct has variable area constant along whole length of said wall;

said doors are fitted with one thrust splitting device mounted on said shared hinge, directly behind said nozzles;

said device is arranged to move vertically across the face of said nozzle, moving in unison with said outer door, hence varying the degree of supercharging and bypass of the said secondary fan and core;

said device, in conjunction with said doors, provide a smooth and aerodynamic airflow with said doors in any position;

said inner door forms a ram into said second chamber when said doors are opened;

said doors totally shut off said main bypass when fully open, providing fully supercharged low bypass turbofan mode at subsonic speeds, and providing ramjet mode at supersonic speeds;

said main fan freewheels at supersonic speeds, allowing the airflow to pass straight through into said ram;

said ram provides said secondary fan with a subsonic airflow at all speeds;

said doors totally shut off the supercharging when fully closed, providing high bypass turbofan engine mode;

a two-stage combustion chamber, to provide extra fuel in said supercharged mode, fitted within said engine core;

a rear mounted thrust vectoring variable area nozzle, with the fixed end fitted to the rear of said secondary bypass duct and arranged to vector the thrust rearwards or downwards;

said rear nozzle is of a smaller diameter than said secondary bypass duct when fully closed;

said nozzles are only deflected downwards with said doors fully closed.

3. A variable bypass jet engine as claimed in claim 1 or 2 wherein said central duct is an integral part of the airframe construction, and is surrounded by a fuel tank located around the aircraft center of gravity.

4. A variable bypass jet engine as claimed in claim 1 or 2 wherein said annular plenum chamber is an integral part of the airframe construction.

5. A variable bypass jet engine as claimed in claim 1 wherein said outer ducts are an integral part of the airframe construction and are positioned lower than said main fan and form a tunnel under the airframe to produce a cushion of air in VTOL mode.

6. A variable bypass jet engine as claimed in claim 1 or 2 wherein there is fitted an intercooling device interposed between said main and secondary fans, situated in or around said central duct and between said second plenum chamber and said secondary fan, to cool down the incoming air charge.

7. A variable bypass jet engine as claimed in claim 1 or 2 wherein said secondary bypass duct is of a fixed ratio and is tuned by the engine designer between a minimum bypass ratio of zero and a maximum of 1.0, for mach number required.

* * * * *